United States Patent [19]
Arai

[11] 4,280,708
[45] Jul. 28, 1981

[54] SEALING DEVICE FOR ENGINE PISTON

[76] Inventor: Yoshio Arai, 1400, Kamihongo, Matsudo-shi, Chiba-ken, Japan

[21] Appl. No.: 64,794

[22] Filed: Aug. 8, 1979

[30] Foreign Application Priority Data

Aug. 21, 1978 [JP] Japan .................................. 53-101678

[51] Int. Cl.³ .............................................. F16J 9/20
[52] U.S. Cl. .................... 277/171; 277/104; 277/119; 277/145; 277/193
[58] Field of Search ............ 277/104, 115, 116, 116.2, 277/117, 119, 142–145, 154, 170, 171, 190, 191, 193, 199, 216

[56] References Cited
U.S. PATENT DOCUMENTS

| 1,381,993 | 6/1921 | Hill et al. | 277/171 |
| 1,814,355 | 7/1931 | Williams | 277/119 |
| 3,831,952 | 8/1974 | Geffroy | 277/171 |

FOREIGN PATENT DOCUMENTS

| 962298 | 4/1957 | Fed. Rep. of Germany | 277/170 |
| 2321343 | 11/1974 | Fed. Rep. of Germany | 277/171 |

Primary Examiner—Robert S. Ward, Jr.
Attorney, Agent, or Firm—Haseltine and Lake

[57] ABSTRACT

A sealing device for pistons comprises a piston-ring groove having upper and lower annular inclined surfaces forming a nearly V-shape in cross-section, a piston ring having an annular inclined surface that bears tightly against the lower annular inclined surface of the piston-ring groove, and an auxiliary ring having an annular inclined surface that slides downwardly along the upper and annular inclined surface of the piston-ring groove to force the piston ring downwardly along the lower annular inclined surface of the piston-ring groove and expand the piston ring.

2 Claims, 4 Drawing Figures

SEALING DEVICE FOR ENGINE PISTON

BACKGROUND OF THE INVENTION

1. Field of the Invention

This invention relates to a sealing device in engines for sealing the clearance between the cylinder wall and the outer surface of the piston fitted in the cylinder bore.

2. Description of Prior Art

In conventional sealing devices as shown in FIG. 3, a piston ring 5 is loosely fitted in a piston-ring groove 4 of rectangular cross section cut around the external surface of a piston 3 fitted in a cylinder bore 2 formed in a cylinder block 1, and the piston ring 5 is split at one point so that it can expand outwardly. In this case, however, since there are gaps between the piston ring 5 and the internal surfaces of the piston ring groove 4, the piston ring 5 is brought out of contact with the upper or lower surface of the piston-ring groove 4 due to inertia of the ring when the piston 3 reaches the top or bottom dead center during the reciprocating movement of the piston 3. As a result, high pressure combustion gas leaks from the combustion chamber 6, formed above the piston head 3, into the crankcase 7 as shown by the arrows (a). On the suction stroke when the pressure in the combustion chamber 6 becomes negative, lubricating oil in the crankcase 7 enters the combustion chamber 6 through the clearance between the piston ring 5 and the piston-ring groove 4. To give the piston ring 5 a tension and absorb its thermal expansion, the piston ring 5 is usually split at one point as indicated by 8 and 9 in FIG. 4. This construction has a disadvantage that the combustion gas and the lubricating oil leak through the split portions 8 and 9 and through the gap between the inner periphery of the piston ring 5 and the piston-ring groove 4 either in the direction indicated by the arrows (b) or in the opposite direction. Thus, the conventional sealing device cannot provide a sufficiently good seal between the combustion chamber 6 and the crankcase 7.

SUMMARY OF THE INVENTION

An object of the present invention is to provide a new sealing device for pistons of engines, which can overcome the drawbacks accompanying the conventional piston rings.

To achieve this objective, the proposed sealing device according to this invention comprises: a piston-ring groove cut in the outer periphery of the piston fitted in the cylinder bore of the reciprocating type engines, said piston-ring groove consisting of first and second annular inclined surfaces forming an outwardly expanding nearly V-shaped cross section; a piston ring fitted in said piston-ring groove, said piston ring having an annular inclined surface to be brought into tight contact with said first annular inclined surface of the piston-ring groove and an outer peripheral sealing surface to slide against the inner surface of the cylinder bore; and an auxiliary ring made of elastic material, said elastic auxiliary ring having an annular inclined surface that slides against said second annular inclined surface of the piston-ring groove, said auxiliary ring contacting with the piston ring and having an inwardly contracting tendency.

In this construction, the auxiliary ring slides downwardly, resulting by its contracting force, along the second annular inclined surface of the piston-ring groove, so that the piston ring is forced to slide outwardly along the first annular inclined surface of the piston-ring groove with the inclined surface of the piston ring contacting the first annular inclined surface of the groove. As a result, the external sealing surface of the piston ring is pressed tightly against the inner wall of the cylinder. Thus, the piston ring can be prevented from disengaging from the contacting surface of the groove while the piston is reciprocating. This in turn prevents very effectively the leakage of the combustion gas and also prevents the lubricating oil from getting into the combustion chamber.

The split portion of the piston ring is formed stepwise and the split ends are overlapped. This construction, in combination with the tight contact between the annular inclined surface of the piston ring and the first annular inclined surface of the piston-ring groove, improves the reliability in preventing the leakage of the combustion gas as well as preventing the oil from getting into the combustion chamber through the split portion of the piston ring.

Other objects, features and advantages of this invention will become apparent from the following description of one embodiment.

DETAILED DESCRIPTION OF THE PREFERRED EMBODIMENT

Figure 1:
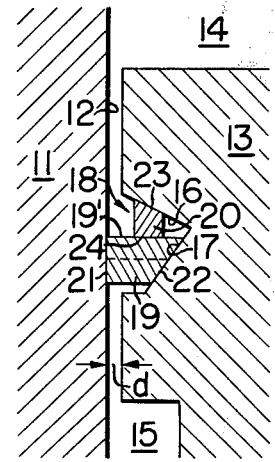
FIG. 1 is a sectional side elevation of a sealing device of this invention.
Figure 4:
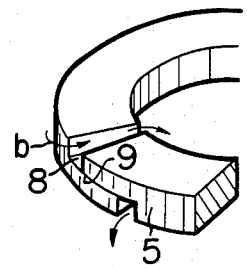
FIG. 4 is a perspective view of part of the sealing device illustrated in FIG. 3.
Figure 3:
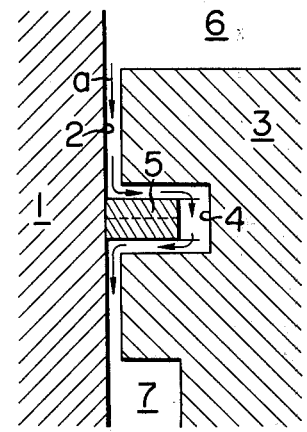
FIG. 3 is a sectional side elevation of conventionl sealing device.

A preferred embodiment of the present invention will now be described with reference to the accompanying drawings. In FIG. 1, a piston 13 is fitted in the cylinder bore 12 formed in the cylinder block 11 of the reciprocating internal combustion engine. The engine has a combustion chamber 14 above the piston 13 and a crankcase 15 below it.

This piston 13 has a piston-ring groove 18 of outwardly expanding V-shaped cross section which consists of upper and lower annular inclined surfaces 16 and 17. Installed into the piston-ring groove 18 are a piston ring 19 and an auxiliary ring 20 which will be described later.

The outer peripheral surface of the piston ring 19 forms a sealing surface 21 that bears tightly against the cylinder wall 12, and its inner peripheral surface forms an annular inclined surface 22 that bears tightly against the lower annular inclined surface 17 of the piston-ring groove 18. Between the upper flat surface 19' of the piston ring 19 and the upper annular inclined surface 16 of the piston ring groove 18 is installed an auxiliary ring 20 whose upper annular inclined surface 23 slides against the upper annular inclined surface 16 of the piston-ring groove 18 and whose lower flat surface 24 abuts against the upper surface 19' of the piston ring 19.

The auxiliary ring 20 is formed of elastic spring material and is split at one point and given an inwardly contracting tendency. Thus, the auxiliary ring 20 slides, by its own compressive force, inwardly as well as downwardly along the upper annular inclined surface 16 of the piston-ring groove 18, with the result that the piston ring 19 is forced downwardly, its internal annular inclined surface 22 slides downwardly as well as outwardly along the lower annular inclined surface 17 of the piston-ring groove 18, and the external sealing surface 21 of the piston ring 19 is forced against the inside wall of the cylinder bore 12. Therefore, the combustion chamber 14 is completely sealed from the crankcase 15 by the tight contact between the external sealing surface 21 of the piston ring 19 and the cylinder wall 12 and between the annular inclined surface 22 of the piston ring 19 and the lower annular inclined surface 17 of the piston-ring groove 18.

Figure 2:
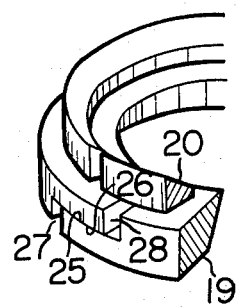
FIG. 2 is perspective view of part of the main portion of the sealing device.

As shown in FIG. 2, the piston ring 19 is cut stepwise to allow it to expand outwardly. The cut surfaces 25 and 26 are overlapped. The tight contact between the internal annular inclined surface 22 of the piston ring 19 and the lower annular inclined surface 17 of the piston-ring groove 18 prevents the combustion gas and the lubricating oil from leaking through the gaps 27 and 28 between the ends of the cut surfaces 25 and 26.

When the engine is running and the piston 13 reciprocates up and down within the cylinder bore 12, the piston ring 19 is constantly pressed downwardly by the gas pressure in the combustion chamber 14 as well as the compressive force of the auxiliary ring 20, so that the internal annular inclined surface 22 and the external sealing surface 21 of the piston ring 19 are tightly forced against the lower annular inclined surface 17 of the piston-ring groove 18 and the cylinder wall 12, respectively. Thus, not only is the gas in the combustion chamber 14 prevented from leaking into the crankcase 15 but the lubricating oil in the crankcase 15 is also blocked from getting into the combustion chamber 14.

On the suction stroke of the engine when the piston 13 rapidly moves down and the pressure in the combustion chamber 14 decreases sharply, the piston ring 19 tends to float from the lower annular inclined surface 17 of the piston-ring groove 18. However, this tendency is restrained by the compressive force of the auxiliary ring 20 and the piston ring 19 is kept in a tight contact with the lower annular inclined surface 17 of the piston-ring groove 18, so that the lubricating oil in the crankcase 15 can be prevented from being drawn into the combustion chamber 14.

If the outside diameter of the piston ring 19 changes due to the thermal expansion and wear, or if the clearance (d) between the external surface of the piston 13 and the cylinder bore 12 changes because of wear of the cylinder bore 12, the piston ring 19 slides freely along the lower annular inclined surface 17 of the piston-ring groove 18 to adjust itself according to those changes. Therefore, the combustion chamber 14 can be separated and sealed from the crankcase 15.

The sealing device of this invention has very wide application and can be used not only in the pistons of internal combustion engines but also in any kind of reciprocating piston engines such as stirling engines.

I claim:

1. A sealing device for reciprocating type pistons of engines in which the piston has a piston ring installed into the piston-ring groove and is slidably fitted in the cylinder bore of the cylinder block, said sealing device comprising: a piston-ring groove cut in the outer periphery of the piston, having an outwardly expanding nearly V-shaped cross section and consisting of first and second annular inclined surfaces; a piston ring consisting of an annular inclined surface that abuts tightly against said first annular inclined surface of the piston-ring groove and an external sealing surface that abuts tightly against the cylinder wall; and an auxiliary ring having an annular inclined surface that bears against said second annular inclined surface of the piston-ring groove and also having a flat surface that bears against the piston ring, said auxiliary ring having a tendency to contract inwardly; whereby the auxiliary ring slides downwardly along the second annular inclined surface to cause the annular inclined surface of the piston ring to bear tightly against and slide outwardly along the first annular inclined surface of the piston-ring groove so that the external sealing surface of the piston ring is forced tightly against the cylinder wall.

2. A sealing device as set forth in claim 1, wherein said piston ring is cut stepwise and the cut portions are overlapped.

* * * * *